United States Patent [19]

Okamura et al.

[11] 4,386,746
[45] Jun. 7, 1983

[54] MAGNETIC TAPE CASSETTE

[75] Inventors: Masatoshi Okamura; Haruo Shiba; Kimio Tanaka, all of Tokyo, Japan

[73] Assignee: TDK Electronics Co., Ltd., Tokyo, Japan

[21] Appl. No.: 210,803

[22] Filed: Nov. 26, 1980

[30] Foreign Application Priority Data

Dec. 4, 1979 [JP] Japan .................. 54-167913[U]
Dec. 8, 1979 [JP] Japan .................. 54-169973[U]

[51] Int. Cl.³ .................. G03B 1/04; G11B 15/32; G11B 23/04
[52] U.S. Cl. .................. 242/199; 206/389
[58] Field of Search ........ 242/55.19 A, 194, 197–200; 354/72–78; 360/93, 96.1, 132; 206/389

[56] References Cited

U.S. PATENT DOCUMENTS 4,004,752 1/1977 Kamaya .................. 242/198

Primary Examiner—Leonard D. Christian
Attorney, Agent, or Firm—Oblon, Fisher, Spivak, McClelland & Maier

[57] ABSTRACT

A recess for positioning a magnetic tape cassette inserted in a deck is formed near a corner of a guard panel, a small projection is formed on at least one of an inner surface of the guard panel or a front surface of a casing near the side edge of the magnetic tape. A tape guide shaft is fixed inside of a casing so as to place the surface of the tape guide slightly behind the level of the front surface of the casing.

1 Claim, 7 Drawing Figures

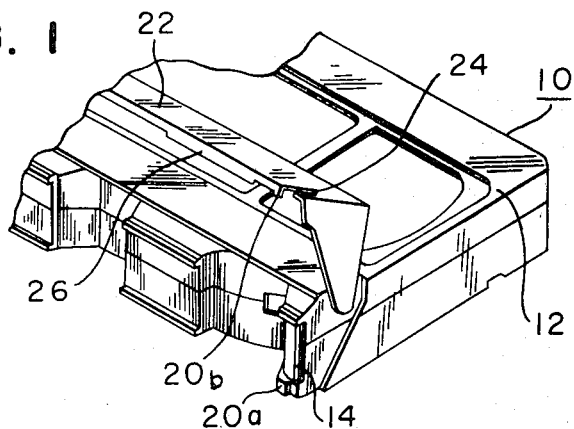
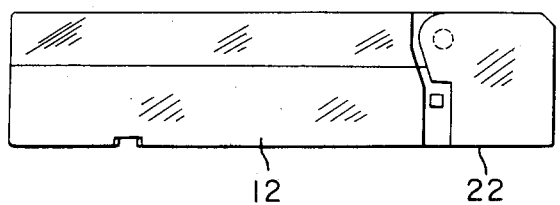
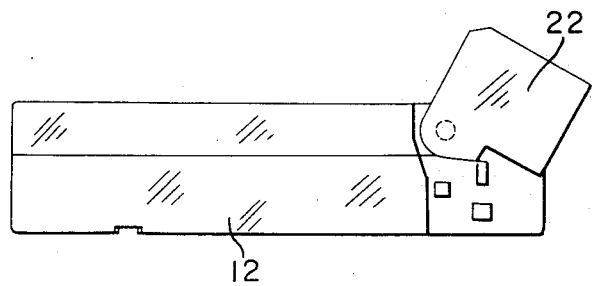
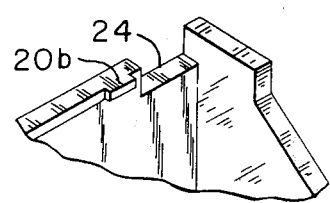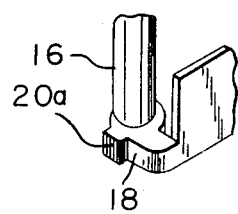

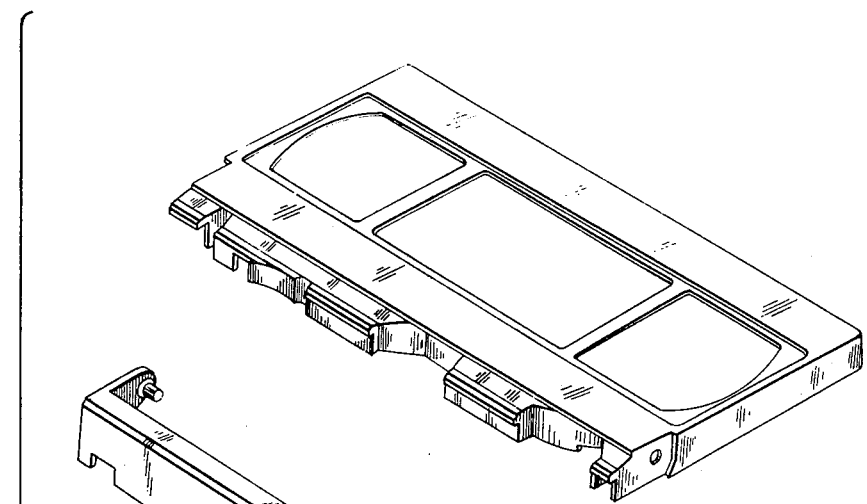
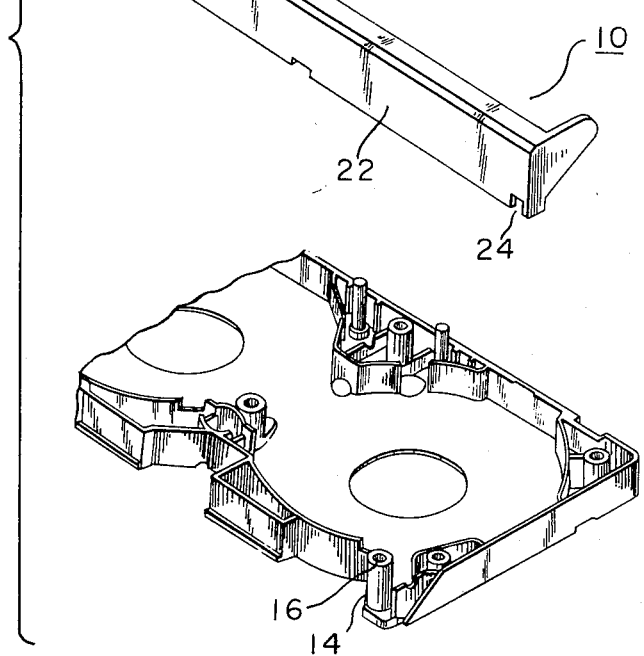
FIG. 5
FIG. 6
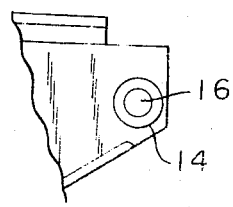

MAGNETIC TAPE CASSETTE

BACKGROUND OF THE INVENTION

1. Field of the Invention

The present invention relates to a magnetic tape cassette mainly for a video deck. More particularly, it provides a magnetic tape cassette which prevents accidents such as that a guide panel for protecting a magnetic tape surface causes damage on the surface of the magnetic tape or causes the cutting off of the magnetic tape.

2. Description of the Prior Arts

In the VHS magnetic tape cassette, the surface of the magnetic tape exposed at the front surface of the body of the casing of the magnetic tape cassette is protected by a guard panel which is rotatably pivoted on the casing to protect the surface from dust and moisture.

The conventional technology will be illustrated in detail. The peripheral end surface of the tape guide made of a metal pipe etc. which guides the magnetic tape at the front surface of the body of the magnetic tape cassette is placed on the same plane as the front surface of the casing of the magnetic tape cassette. The inner surface of the guard panel is stopped at the front surface of the casing or is at the same plane as the magnetic tape with a slight gap or is placed with a slight gap in the structure whereby the surface of the magnetic tape is prevented from contact with dust and moisture. The magnetic tape cassette for the video deck, however, is heavy. Moreover, high impact stress is applied in the transferring, the falling or the sudden closing of the opened guard panel whereby the guard panel is momentarily bent to concentrate the impact force at the recess for positioning which is formed near the corner of the guard panel and accordingly, the sharp edge formed at the recess contacts with the surface of the magnetic tape and the surface of the magnetic tape is damaged by nipping between the sharp edge and the tape guide. Sometimes, the magnetic tape is cut off.

SUMMARY OF THE INVENTION

It is an object of the present invention to overcome easily the above-mentioned disadvantages to prevent the accidental cutting off of the magnetic tape without lowering the function for preventing dust by the guard panel and without changing the outer standard size from that of the body of the conventional magnetic tape cassette.

The foregoing and other objects of the present invention have been attained by providing a magnetic tape cassette which protects a surface of a magnetic tape by a guard panel having a recess near a corner for positioning the magnetic tape cassette inserted in a deck, wherein a tape guide shaft is fixed inside of a casing so as to place the surface of the tape guide of the body of the magnetic tape cassette slightly behind the level of the front surface of the casing.

BRIEF DESCRIPTION OF THE DRAWINGS

FIG. 1 is a partial schematic view of one embodiment of the magnetic tape cassette according to the present invention;

FIGS. 2 (a), (b) are respectively left side views of the guard panel of the magnetic tape cassette in the closing condition and in the opening condition.

FIGS. 3 and 4 are partial schematic views of the guard panel having a small projection and the casing having a small projection at the front surface.

FIGS. 5 are assembly drawings of the magnetic tape cassette; and

FIG. 6 is a partial plane view of the edge for the tape guide.

DETAILED DESCRIPTION OF THE PREFERRED EMBODIMENTS

Referring to the drawings, the magnetic tape cassette of the present invention will be illustrated.

The surface of the magnetic tape is protected by the guard panel (22) having the recess (24) for positioning in the insertion of the magnetic tape cassette in the deck, near the corner. The tape guide shaft (16) is fixed inside of the casing so that the surface of the tape guide (14) of the body of the magnetic tape cassette is placed behind the level of the front surface of the casing (12).

FIG. 1 is a partial schematic view of the magnetic tape cassette (10) without the magnetic tape, in the condition of turning upwardly the guard panel (22) of the cassette (10) from the front position of the casing (12) of the magnetic tape cassette (10).

The tape guide (14) made of a metal pipe is placed at the front right end of the casing (12). The tape guide (14) is fitted to the tape guide shaft (16) projected on the lower half casing for the casing (12). The tape guide shaft (16) is formed inside of the casing (12) in comparison with the casing so that the front end surface of the tape guide (14) is placed slightly inside from the front end surface of the projected edge part (18) for supporting the tape guide shaft (16), whereby the gap for protecting the magnetic tape between the guide and the guard panel is precisely maintained.

In accordance with the other embodiment of the present invention, the front end surface of the tape guide (14) is placed inside of the casing (12) in comparison with the conventional one whereby the gap for protecting the magnetic tape is maintained and a small projection (20 a) is formed so as to forwardly project from the lower part of the tape guide (14) in the left side part of the projected edge part (18). In order to further protect the magnetic tape without failure, the small projection (20 b) is formed at the part contacting the guard panel (22) with the small projection (20 a) in the covering the front surface of the casing (12) by the guard panel (22).

The small projection (20 b) is formed near the recess (24) for positioning which is formed at the right side of the guard panel (22).

In the other embodiment, the same effect may be imparted only by forming either of the small projection (20 a) or the small projection (20 b). The small projection (20 b) especially has the advantage that it is easily formed in view of the preparation of a mold.

In a further embodiment, the outer diameter of the tape guide (14) fitted on the tape guide shaft (16) is reduced to perform a similar effect.

In the other embodiment, the rectangular recess (24) in the conventional technology can be modified to a smooth curved recess to eliminate sharp edge, and the sharp edge of the surface of the recess is eliminated by chamfering the mold. The small projection (20 b) is also formed on the inner surface of the guard panel (22) at the part contacting with the upper half casing, whereby the accident for cutting off the magnetic tape can be completely prevented.

In accordance with the present invention, the accident of cutting off the magnetic tape is completely prevented by forming the gap for protecting the magnetic tape by only shifting the tape guide shaft slightly inside in comparison with the conventional one without changing the outer standard size from that of the body of the conventional magnetic tape cassette and without lowering the function of the guard panel for protecting the magnetic tape from dust and moisture. The structure of the magnetic tape cassette of the present invention is remarkably simple and the running of the magnetic tape and the opening of the guard panel are not disturbed. The problems have been solved without increasing the production cost. The small projection can be formed only by drilling at a part of the used mold and accordingly, it is unnecessary to prepare new molds which should be measured at more than 1,000 parts, but it is possible to use the used molds by the drilling.

It is preferable to give a gap between the surface of the tape guide and the level of the front surface of the casing is in a range from 0.2 mm to 0.3 mm.

The present invention has been illustrated in detail by the preferable embodiments. The present invention is not limited to these embodiments and can be modified in the scope of the claimed invention.

What is claimed as new and desired to be secured by Letters Patent of the United States is:

1. A magnetic tape cassette comprising:
    a housing having a first end including a surface defining a tape travel path;
    a guard panel movably attached to said housing and positionable in a closed position to protect tape travel path;
    a recess at one corner of said guard panel for positioning said cassette in a deck;
    a tape guide in one corner of said housing corresponding to said one corner of said guard panel; and
    a projection formed on at least one of said one corner of said guard panel and said surface of said housing, said projection extending towards, and contacting, the other of said guard panel and housing when said guard panel is in said closed position;
    whereby said projection maintains said guard panel spaced from said tape guide and said tape travel path.

* * * * *